United States Patent [19]

Elmore et al.

[11] Patent Number: 4,678,843

[45] Date of Patent: Jul. 7, 1987

[54] PROCESS FOR THE AMMONIUM HYDROXIDE HYDROLYSIS OF POLYMERS OF ACETOXYSTYRENE TO POLYMERS OF VINYLPHENOL

[75] Inventors: Jimmy D. Elmore; Elizabeth S. Goff, both of Louisville, Ky.

[73] Assignee: Celanese Corporation, New York, N.Y.

[21] Appl. No.: 912,039

[22] Filed: Sep. 29, 1986

[51] Int. Cl.$^4$ ............................................. C08F 8/12
[52] U.S. Cl. ................................ 525/378; 525/329.5; 525/383
[58] Field of Search ............................... 525/378, 383

[56] References Cited

U.S. PATENT DOCUMENTS

| | | |
|---|---|---|
| 2,276,138 | 3/1945 | Alderman et al. ............... 525/329.5 |
| 3,547,858 | 12/1970 | Worrall ............................ 525/329.5 |
| 3,963,662 | 6/1976 | Fujiwara et al. ................. 525/162 |
| 3,970,534 | 7/1976 | Fujiwara et al. ................. 525/298 |
| 4,129,617 | 12/1978 | Machi et al. ..................... 525/298 |
| 4,544,704 | 10/1985 | Hefner, Jr. ....................... 525/298 |

*Primary Examiner*—Joseph L. Schofer
*Assistant Examiner*—Bernard Lipman
*Attorney, Agent, or Firm*—H. P. Price

[57] ABSTRACT

Polymers of 4-acetoxystyrene are hydrolyzed to polymers of p-vinylphenol with ammonium hydroxide followed by sparging with carbon dioxide. Such polymers are useful in photoresist and as protective coatings for metal.

16 Claims, No Drawings

PROCESS FOR THE AMMONIUM HYDROXIDE HYDROLYSIS OF POLYMERS OF ACETOXYSTYRENE TO POLYMERS OF VINYLPHENOL

BACKGROUND OF INVENTION

The field of art to which this invention pertains is homopolymers and copolymers of vinylphenol Homopolymers and copolymers of 4-hydroxystyrene, or p-vinylphenol as it is also called, are known compositions which have been used, for example, in the manufacture of metal treatment compositions, photoresists, epoxy resins and epoxy resin curing agents. Polymers of p-vinylphenol can be made by polymerizing p-vinylphenol itself. However, p-vinylphenol is an unstable compound and must be refrigerated to prevent it from polymerizing spontaneously. Even under refrigeration, the monomer will slowly polymerize to low molecular weight polymers. 4-Acetoxystyrene, the acetic acid ester of p-vinylphenol, is a stable monomer which can be readily homopolymerized and copolymerized to low, medium and high molecular weight polymers. After polymerization, the phenolic ester group can be hydrolyzed to produced p-vinylphenol polymers.

Corson et. al., Journal of Organic Chemistry, 23, 544-549 (1958), describe a 5 step process for making p-vinylphenol from phenol. The phenol is first acetylated to p-hydroxyacetophenone which is then acetylated to p-acetoxyacetophenone. This compound is hydrogenated to p-acetoxyphenylmethyl carbinol which is then dehydrated to p-acetoxystyrene. The p-acetoxystyrene is saponified to p-vinylphenol using potassium hydroxide.

The ester interchange reaction of poly 4-acetoxystyrene in methanol using sodium methylate is described in U.S. Pat. No. 2,276,138. About 84 percent of the acetate groups are removed by the interchange reaction. Packham, in the Journal of the Chemical Society, 1964, 2617-2624, describes the hydrolysis of crosslinked poly-4-hydroxystyrene by refluxing the polymer in alkaline aqueous dioxane for 2 days. In U.S. Pat. No. 4,544,704, a copolymer of sytrene and p-isopropenylphenylacetate is hydrolyzed with aqueous sodium hydroxide in methanol and tuluene using a small amount of benzyltrimethylammonium chloride as a phase transfer agent. Arshady et. al., Journal of Polymer Science 12, 2017-2025 (1974), hydrolyzed copolymers of styrene and acetoxystyrene to the vinylphenol polymer using hydrazine hydrate in dioxane.

The hydrolysis or methanolysis of polymers of 4-acetoxystyrene is very difficult to carry to 85 percent or above completion. Also, when alkali metal hydroxides are used, it is extremely difficult to remove all traces of alkali metal salts which can be detrimental for some applications and uses of the vinylphenol polymer.

SUMMARY OF INVENTION

This invention pertains to a process for hydrolyzing polymers of 4-acetoxystyrene to polymers of 4-vinylphenol. More specifically, the invention relates to a hydrolysis process using ammonia as the hydrolysis catalyst. Even more specifically, the invention pertains to a process for hydrolyzing polymers of 4-acetoxystyrene to polymers of 4-vinylphenol using ammonia as the hydrolysis catalyst and removing the ammonium salt by contacting the polymer with wet carbon dioxide to form ammonium carbonate which is then decomposed by heat to ammonia, carbon dioxide and water.

By the process of this invention, polymers of 4-acetoxystyrene are hydrolyzed to polymers of 4-vinylphenol by heating at about 50° C. to about 150° C. in the presence of ammonia for a time sufficient to hydrolyze at least 85 percent of the acetoxy group to phenolic groups. When the hydrolysis is complete, the ammonium phenolate formed in the reaction is converted to ammonium carbonate by sparging with wet carbon dioxide and removed by heating at about 110° C. to about 180° C. The 4-vinylphenol polymer is recovered as an organic solvent solution or can be recovered neat.

DETAILED DESCRIPTION OF INVENTION

Polymers useful in this invention are copolymers of 4-acetoxystyrene. 4-acetoxystyrene can be polymerized in solution, suspension, emulsion, or bulk using well known free radical catalysts, such as, for example, the peroxide and azo compounds. 4-acetoxystyrene will homopolymerize readily in the same manner that styrene homopolymerizes and can also be copolymerized with sytrene and with monomers which are copolymerizable with styrene. Examples of comonomers, in addition to styrene, are vinyl toluene, alpha-methyl styrene, the diene monomers, such as butadiene, the acrylate and methacrylate ester monomers such as metyl acrylate, methyl methacrylate, ethyl acrylate, butylacrylate, butyl methacrylate and 2-ethylhexyl acrylate. Additional monomers include the polymerizable acids, such as acrylic acid, methacrylic acid, maleic anhydride and maleic acid, fumaric acid and the like. The preferred comonomer is sytrene.

Useful copolymers contain about 1 to about 99 parts by weight of 4-acetoxystyrene to about 1 to about 99 parts by weight of monomer copolymerizable therewith. Preferred copolymers contain about 25 to about 75 parts of 4-acetoxysytrene to about 75 to about 25 parts of monomer copolymerizable therewith.

To carry out the process of this invention, the 4-acetoxystyrene polymer is dissolved in a solvent which is miscible with water in the amount of about at least 10 weight percent water in the solvent. Preferred solvents are those which are completely miscible with water. Examples of useful solvents are methanol, ethanol, isopropanol, the butanols, glycols, such as ethylene glycol, propylene glycol, diethylene glycol, dipropylene glycol, and the like and the ethers of the glycols, such as ethylene glycol monomethyl ether, ethylene glycol monoethyl ether, ethylene glycol monopropyl ether, ethylene glycol monobutyl ether, diethylene glycol monomethyl ether, and the like. Mixtures of water miscible solvents and water immiscible solvents can also be used. An example of a water immiscible solvent is xylene. The solution of polymer used in this invention will contain about 25 to 75 weight percent polymer and preferably, about 40 to about 60 weight percent.

Ammonia is the base used in this invention to catalyze the hydrolysis of the acetoxy groups to phenolic groups. The ammonia preferably is used as an aqueous solution of ammonia at a concentration of about 10 weight percent ammonia in water up to about 30 weight percent. Preferably the solution will contain about 25 to about 30 weight percent ammonia. Ammonia gas can also be used in this invention. However, when gas is used, the reaction proceeds slowly until some phenolate ammonia salt is formed. Also at least one mole of active hydrogen compound, e.g., water or alcohol, must be present in the solvent for each equivalent of acetoxy group. Ammonia gas is introduced into the reactor as a sparge below the surface of the reaction solution at a sufficient rate to maintain an ammonia saturated solution. The amount of ammonia, in the form of its hydroxide, will vary from about 0.5 to about 1.5 moles of aqueous ammonia per equivalent of acetoxystyrene in the polymer.

In carrying out the process of this invention, ammonia gas or ammonium hydroxide is added to the solution of 4-acetoxystyrene polymer and heating is conducted at a temperature of about 50° C. to about 150° C. for a time sufficient to hydrolyze the acetoxy groups to phenol groups. Wet carbon dioxide gas is then introduced into the reaction solution as a sparge below the solution surface. During the introduction of carbon dioxide gas, the temperature is held at about 110° C. to about 180° C. The carbon dioxide reacts with the ammonia to form ammonium carbonate which under the influence of heat decomposes to ammonia, carbon dioxide and water, which then can be distilled or sparged out with nitrogen from the reaction solution.

Preferably, in order to avoid color formation, distillation is conducted to remove some of the volatiles and to lower the nitrogen content to 3-4 weight percent, based on the weight of polymer, before contacting the polymer with carbon dioxide. It has been found that the nitrogen content cannot be lowered below about 3 percent without heating to excessively high temperatures for excessively long times. However, by the wet carbon dioxide treatment, the nitrogen content can be lowered to below one percent.

Alternatively, after the hydrolysis reaction is complete, the solvents and volatiles can be removed by vacuum distillation to a pot temperature of about 150° C. to about 200° C. The solid polymer, which has a nitrogen content of at least about 3 percent, is ground to a powder and is contacted with a flow of wet carbon dioxide gas while being heated at about 110° C. to about 180° C., preferably under vacuum. Humid air has been found to be an adequate source of wet carbon dioxide.

After the removal of the ammonia, the 4-hydroxystyrene polymer can be used per se as its solution or the polymer can be recovered as a solid either by removal of all solvents by vacuum distillation or by precipitating the polymer from solution.

The process of this invention is described in more detail in the following examples. All parts and percentages are by weight unless otherwise indicated.

EXAMPLE 1

To a suitable reactor equipped with a dropping funnel are added 747 parts of ethylene glycol monopropyl ether. To the dropping funnel are added 270 parts of sytrene, 850.5 parts 4-acetoxystyrene, 40.3 parts of ethyl-3,3-di(t-amylperoxy) butyrate at 75 percent solids in mineral spirits and 33.6 parts of n-octyl mercaptan. A nitrogen sparge is introduced into the reactor and heat is applied raising the temperature to 145° C. The monomer-catalyst solution is slowly added over a 2 hour period with the temperature being held at reflux (140°–148° C.). After the addition of monomer-catalyst solution is completed, the temperature is held at 147° C. for 1 hour. Additional catalyst, 4.5 parts, is then added. Heating at 145°–146° C. is continued for 2 hours. The resulting polymer solution has a solid content of 58.5 percent and Gardner Holdt viscosity at 25° C. of $Z_1$-$Z_2$.

EXAMPLE 2

To a suitable reactor are added 1800 parts of the copolymer solution of Example 1 and 296.1 parts of ammonium hydroxide at a concentration of 29 percent ammonia in water. The temperature is held between 84° C. and 100° C. for 3 hours. Heat is then applied raising the temperature over a 3 hour and 20 minute period to 155° C. while removing distillate. The nitrogen content is found to be 3.42 percent by Kjeldahl analysis.

The reactants are heated at 120° C. while being sparged with nitrogen for 3 hours. At the end of this time, the nitrogen content is still 3.42 percent. The temperature is then held at 80° C. and water aspirator vacuum is applied until the solution is clear of bubbles. The nitrogen content remains at 3.42 percent.

The reactants are then sparged with wet carbon dioxide for 2 hours with the temperature being raised from 104° C. to 150° C. The temperature is slowly raised to 160° C. over a 1 hour period and is held for 8 hours at 160° C. to 170° C., 3 hours at 150° C. to 160° C. and for 1 hour and 45 minutes at 180° C. Carbon dioxide sparge is continued throughout this heating period. The carbon dioxide sparge and heating are then discontinued and the propyl ether of ethylene glycol is added adjusting the polymer solution to a solids content of 57 percent. The weight per phenolic hydroxyl of the polymer is 195.9 which calculates to a hydrolysis of 87 percent. The ash content is 0.79 percent and the nitrogen content is 1.4 percent.

EXAMPLE 3

Using the same procedure described in Example 2, 162 parts of a homopolymer of acetoxystyrene at 58 percent solids in the propyl ether of ethylene glycol and 60 parts of 29 weight percent ammonium hydroxide are added to a reactor. The temperature is raised to 100° C. and is held at 100° C. for 4 hours. The temperature is raised to 150° C. while removing distillate. Wet carbon dioxide gas is bubbled through the polymer solution for a period of 8 hours while holding the temperature of 150° C. The temperature is then lowered to 100° C. and nitrogen sparge is introduced into the polymer solution for a period of 1 hour to remove decomposition products.

The resulting polymer solution has a nitrogen content of less than 1 percent and the conversion of acetoxy groups to phenolic groups of the polymer is about 90 percent.

EXAMPLE 4

To a suitable reactor equipped with a dropping funnel are added 959.9 parts of ethylene glycol monopropyl ether. To the dropping funnel are added 719.8 parts of p-acetoxystyrene, 719.8 parts of styrene, 52.8 parts of ethyl-3,3-di(t-amylperoxy) butyrate at 75 percent in mineral spirits and 43.25 parts of n-octyl mercaptan. Heat and agitation are applied raising the temperature to 146° C. Slow addition of the monomer catalyst solution is begun and completed in a 2 hour period while keeping the temperature at 145° C. to 146° C. Heating at 145° C. is continued for 1 hour. Additional catalyst, 5 parts, is then added and heating is continued for two hours at 142° C. to complete the polymerization reaction.

The resulting polymer solution has a Gardner Holdt viscosity of $Z_1$-$Z_2$ at 58.52 percent N.V. and at 25° C.

EXAMPLE 5

To a suitable reactor are added 42.6 parts of methanol and 150 parts of the polymer solution of Example 4. Heat is applied raising the temperature to 76° C. Ammonia gas is then slowly bubbled through the solution for 4 hours and 45 minutes while keeping the temperature at 75° C. to 76° C. Infrared analysis showed very little conversion of acetate groups to phenolic groups. Heating at 75° C. to 77° C. with ammonia gas sparge is continued for 7 hours and 45 minutes. Infrared analysis indicated about 10 to 20 percent conversion of acetate groups to phenolic groups. Heating at 75° C. to 77° C. with ammonia gas sparge is continued for 12 hours and 15 minutes. Infrared analysis indicates about 75 percent conversion of acetate groups to phenolic groups. After an additional 5 hours of heating period at 75° C. to 77° C. with ammonia gas sparge, the conversion of acetate groups to phenolic groups is about 85 percent. The amount of ammonia gas introduced into the reactor is 65.3 parts.

Heating at reflux, 75° C. to 77° C., is continued for 16 hours with no introduction of ammonia. The volatiles are then distilled off at a pot temperature of 190° C. and a head temperature of 155° C. A sample taken at this time has a solids content of 70 percent and 1.6 percent nitrogen. Distillation is then continued under vacuum while holding the pot temperature at 200° C. for a period of 2 hours and 45 minutes with vacuum increasing to 10-11 cm. At the end of the period, heating and distillation are discontinued and the resinous reactor contents are poured onto foil to cool.

The resinous product is ground to a powder and is placed in a vacuum oven in a thin layer. The temperature in the oven is raised to 150° C. and the pressure is reduced to about 12 mm Hg and is then raised to 27 mm Hg by slightly opening the vent tube allowing humid atmospheric air to enter the oven and contact the polymer. Heating under vacuum is continued for 5 hours. The temperature in the oven is then raised to 165° C. and heating at this temperature is continued for 2 hours and 30 minutes. The polymer after treatment has a nitrogen content of 0.4 percent and a weight per phenolic hydroxyl of 328.

The polymers and copolymers of p-vinylphenol obtained by the process of this invention can be used to make compositions useful in the treatment of metal surfaces to impart corrosion resistance and paint adhesion characteristics to the metal as described in U.S. Pat. No. 4,333,015, which is hereby incorporated by reference.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A process which comprises:
   a. reacting a polymer of 4-acetoxystyrene with ammonia at a temperature of about 50° C. to about 150° C. for a time sufficient to hydrolyze the acetoxy groups to phenol groups;
   b. contacting the polymer with wet carbon dioxide gas at a temperature of about 110° C. to aabout 180° C. to form ammonium carbonate which immediately decomposes to ammonia, carbon dioxide and water; and
   c. removing the decomposition products by sparging with nitrogen or by distillation.

2. The process of claim 1 wherein the ammonia is present as ammonium hydroxide in the amount of about 0.5 to about 1.5 moles of ammonium hydroxide per equivalent of acetoxy groups in the polymer.

3. The process of claim 1 wherein the reaction is conducted with ammonia gas and the polymer is dissolved in a solvent which contains at least one mole of active hydrogen per equivalent of acetoxy groups.

4. The process of claim 3 wherein the active hydrogen containing solvent is methanol 5. The process of claim 1 wherein the wet carbon dioxide gas is introduced into an organic solvent solution of the polymer as a sparge below the surface of the solution.

6. The process of claim 1 wherein the polymer of 4-acetoxystyrene is a homopolymer.

7. The process of claim 1 wherein the polymer of 4-acetoxystyrene is a copolymer.

8. The process of claim 7 wherein the copolymer is a copolymer of 4-acetoxystyrene and styrene.

9. A process which comprises:
   a. reacting a polymer of 4-acetoxystyrene dissolved in an organic solvent with ammonia at a temperature of about 50° C. to about 150° C. for a time sufficient to hydrolyze the acetoxy groups to phenol groups;
   b. distiling off a portion of the solvent, thereby lowering the nitrogen content of the polymer to between 3 and 4 weight percent;
   c. contacting the polymer with wet carbon dioxide gas at a temperature of about 100° C. to about 180° C. to form ammonium carbonate which immediately decomposes to ammonia, carbon dioxide and water; and
   d. removing the decomposition products by sparging with nitrogen or by distillation.

10. The process of claim 9 wherein the ammonia is present as ammonium hydroxide in the amount of about 0.5 to about 1.5 moles of ammonium hydroxide per equivalent of acetoxy groups in the polymer.

11. The process of claim 9 wherein the reaction is conducted with ammonia gas and the polymer is dissolved in a solvent which contains at least one mole of active hydrogen per equivalent of acetoxy groups.

12. The process of claim 1 wherein the active hydrogen containing solvent is methanol.

13. The process of claim 9 wherein the wet carbon dioxide gas is introduced as a sparge below the surface of the polymer solution.

14. The process of claim 9 wherein the polymer of 4-acetoxystyrene is a homopolymer.

15. The process of claim 9 wherein the polymer of 4-acetoxystyrene is a copolymer.

16. The process of claim 15 wherein the copolymer is a copolymer of 4-acetoxystyrene and styrene.

* * * * *